(12) United States Patent
Shudo

(10) Patent No.: US 6,761,673 B2
(45) Date of Patent: Jul. 13, 2004

(54) LIQUID FORM ADDITION CURING TYPE SILICONE RUBBER COMPOSITION FOR FLUORORESIN COVERED FIXING ROLLER AND FLUORORESIN COVERED FIXING ROLLER

(75) Inventor: Shigeki Shudo, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 54 days.

(21) Appl. No.: 10/115,241

(22) Filed: Apr. 4, 2002

(65) Prior Publication Data

US 2002/0146575 A1 Oct. 10, 2002

(30) Foreign Application Priority Data

Apr. 5, 2001 (JP) ........................................ 2001-107558

(51) Int. Cl.$^7$ ...................... F16C 13/00; G03G 15/20; B32B 15/06; B32B 15/08; C08L 83/04
(52) U.S. Cl. ..................... 492/56; 492/53; 399/122; 428/421; 428/447; 428/448; 428/450; 524/860; 524/861; 524/862; 524/866
(58) Field of Search ................. 524/858–863, 524/868; 528/15, 31–33, 37; 399/122; 428/446–448, 450, 421; 492/49, 56

(56) References Cited

U.S. PATENT DOCUMENTS 5,504,147 A * 4/1996 Fujiki et al. .............. 524/730
5,770,298 A * 6/1998 Nakamura et al. ....... 428/195.1
6,090,887 A    7/2000 Nakamura et al.
6,111,221 A    8/2000 Miyakoshi et al.
6,136,447 A * 10/2000 Nakamura et al. .......... 399/338
6,231,954 B1   5/2001 Yoshida et al.
6,328,682 B1  12/2001 Shudo
6,663,967 B1 * 12/2003 Ziebell ..................... 428/413

FOREIGN PATENT DOCUMENTS

JP          9-165515       6/1997

* cited by examiner

*Primary Examiner*—Philip Tucker
*Assistant Examiner*—Michael Feely
(74) *Attorney, Agent, or Firm*—Oblon, Spivak, McClelland, Maier & Neustadt, P.C.

(57) ABSTRACT

A liquid form addition curable silicone rubber composition for forming a fluororesin covered fixing roller is provided. This composition includes (a) 100 parts by weight of an organopolysiloxane with at least two alkenyl groups bonded to non-terminal silicon atoms; (b) an organohydrogenpolysiloxane with at least two silicon-bonded hydrogen atoms, in a sufficient quantity to produce a molar ratio of silicon-bonded hydrogen atoms within said constituent (b) relative to silicon-bonded alkenyl groups within said constituent (a) of 0.4 to 5.0; (c) an effective quantity of a platinum based catalyst; (d) 0.1 to 10 parts by weight of dry process silica; and (e) 0.05 to 5 parts by weight of a cyclic diorganopolysiloxane with at least three silicon-bonded alkenyl groups. This composition is used for formation of the silicone rubber layer of a fixing roller made up of a metal core, a silicone rubber layer on the core, and a fluorine based coating provided on the rubber layer. Good adhesion is obtained between the silicone rubber layer and both of the metal core and the fluorine-based coating, and as a result excellent durability is achieved.

23 Claims, 1 Drawing Sheet

LIQUID FORM ADDITION CURING TYPE SILICONE RUBBER COMPOSITION FOR FLUORORESIN COVERED FIXING ROLLER AND FLUORORESIN COVERED FIXING ROLLER

BACKGROUND OF THE INVENTION

1. Field of the Invention

The present invention relates to a liquid form addition curable silicone rubber composition for a fluororesin covered fixing roller (in other words, fuser roller) used in devices such as copiers, laser printers and facsimiles, and to a fluororesin covered fixing roller with a silicone rubber layer formed from a cured product of such a composition.

2. Description of the Prior Art

Silicone rubber is widely used for the fixing rollers used in devices such as copiers, laser printers and facsimiles. The reason for this prevalence is that in comparison with other rubber materials, silicone rubber displays superior properties of releasability relative to toner, heat resistance and compression set. However, with the recent increases in speed of the above types of devices, a process called oil fusing, in which silicone oil (so-called fuser oil) is supplied to the roller surface, is now used in order to further improve the toner releasability. In addition, in order to increase the time required for fusing at such high speeds, reductions in the hardness of the rubber material are being used as a way of maintaining the fusing width (nip width).

However, because silicone rubber is formed from the same materials as silicone oil, reducing the hardness of the rubber can result in swelling caused by the fused silicone oil. One method for resolving this problem involves preparing a roller from a low hardness silicone rubber or a silicone rubber foam, and then covering the surface of this roller with a flexible coating formed from a fluororubber latex or a fluororesin tube. This type of coating extends the life of the fixing roller markedly, but the problem remains that with the increases in speed of the aforementioned devices, the adhesion interface between the silicone rubber and the fluororesin tube or fluororubber latex, as well as the adhesion interface between the silicone rubber and the cylindrical metal core, are unable to withstand for extended periods the stress generated by high temperatures and deformation.

SUMMARY OF THE INVENTION

The present invention is the result of intensive research in view of the issues described above, and has an object of providing a liquid form addition curable silicone rubber composition for a fluororesin covered fixing roller, in which a fluororesin covering layer (a surface mold releasing layer) formed from a fluorine based coating material such as fluororubber latex or a fluororesin tube of PFA, PTFE or FEP or the like, is bonded to a silicone rubber layer, and this silicone rubber is also bonded to a metal core, wherein even if the thus formed roller is used for extended periods, separation of the layers is unlikely to occur. Another object of the present invention is to provide a fixing roller with a silicone rubber layer formed from a cured product of the above type of composition.

In other words, in order to resolve the aforementioned issues, the present invention provides a liquid form addition curable silicone rubber composition for forming a fluororesin covered fixing roller comprising:

(a) 100 parts by weight of an organopolysiloxane with at least two alkenyl groups bonded to non-terminal silicon atoms within the molecular chain of a molecule, (b) an organohydrogenpolysiloxane with at least two hydrogen atoms bonded to silicon atoms within a single molecule, in a sufficient quantity to produce a molar ratio of silicon atom-bonded hydrogen atoms within the constituent (b) relative to the alkenyl groups bonded to silicon atoms within the constituent (a) of 0.4 to 5.0, (c) an effective quantity of a platinum based catalyst, (d) 0.1 to 10 parts by weight of dry process silica, and (e) 0.05 to 5 parts by weight of a cyclic diorganopolysiloxane with at least three alkenyl groups bonded to silicon atoms within a single molecule.

Furthermore, the present invention also provides a fluororesin covered fixing roller comprising a metal core, a silicone rubber layer formed either directly or indirectly around the outer periphery of the core, and a fluororesin layer (surface mold releasing layer) formed on the outer periphery of the silicone rubber layer, wherein the silicone rubber layer is a cured product of a liquid form addition curable silicone rubber composition as described above.

DETAILED DESCRIPTION OF THE PREFERRED EMBODIMENTS

Figure 1:
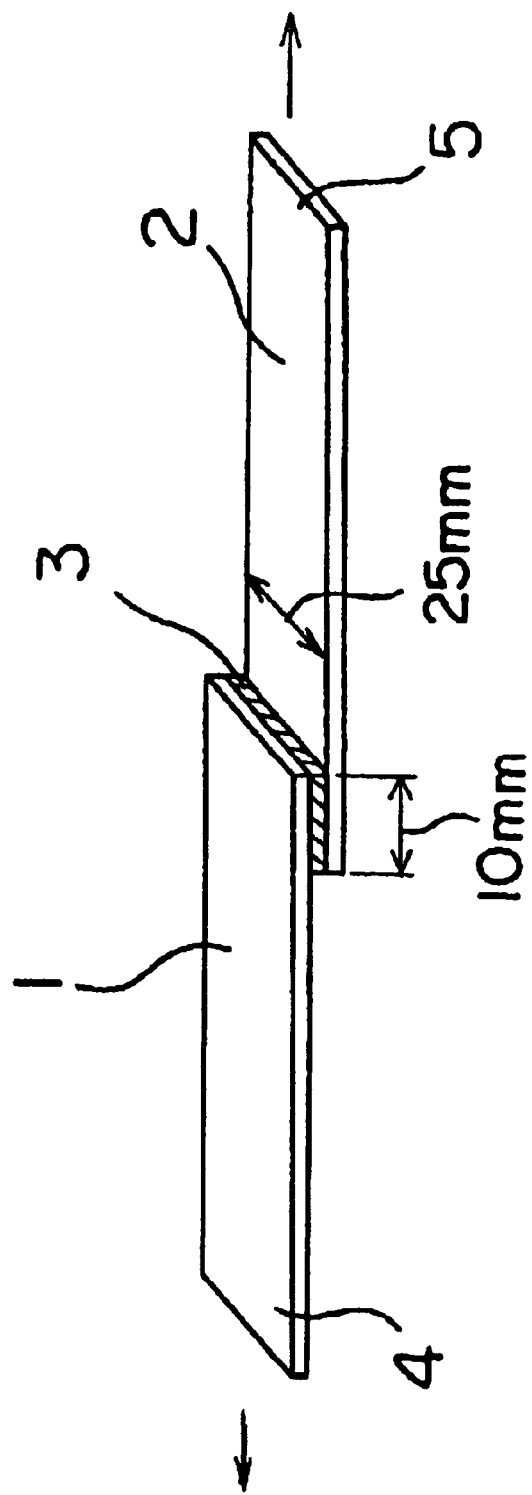
FIG. 1 is a perspective view of an experimental sample used in adhesion strength under shear evaluations.

As follows each of the constituents of a silicone rubber composition of the present invention are described.

Constituent (a): Organopolysiloxane

Constituent (a), which is one of the essential constituents of a composition of the present invention, is an organopolysiloxane with at least two alkenyl groups bonded to non-terminal silicon atoms (in other words, silicon atoms within the backbone siloxane chain, but excluding the silicon atoms in the terminal siloxane units) within the molecular chain (in other words, alkenyl groups bonded to the silicon atoms of bifunctional siloxane units or trifunctional siloxane units represented by the formulas $R_2SiO_{2/2}$ or $RSiO_{3/2}$ (wherein R is an unsubstituted or halogen substituted monovalent hydrocarbon group, as described below) to form so-called pendent substituent groups). The molecular structure of this organopolysiloxane should preferably be essentially a straight chain, although a molecular structure with some minor branching is also acceptable.

This organopolysiloxane should preferably be of a structure represented by the general formula (1) shown below.

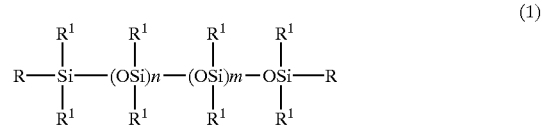

(1)

wherein, R represents an unsubstituted or halogen substituted monovalent hydrocarbon group, $R^1$ represents an unsubstituted or a halogen substituted monovalent hydrocarbon group with no aliphatic unsaturated double bonds, $R^2$ represents an alkenyl group, n represents an integer of 2 or greater, and m represents 0, or an integer of 1 or greater.

Suitable examples of the unsubstituted or halogen substituted monovalent hydrocarbon groups represented by R in the aforementioned general formula (1) typically include hydrocarbon groups of 1 to 12, and preferably 1 to 10, carbon atoms, including alkyl groups such as methyl groups, ethyl groups, propyl groups, isopropyl groups, butyl groups, isobutyl groups, tert-butyl groups, pentyl groups, hexyl groups and cyclohexyl groups; alkenyl groups such as vinyl groups, allyl groups, propenyl groups and butenyl groups; aryl groups such as phenyl groups, tolyl groups and xylyl groups; aralkyl groups such as benzyl groups and phenyl-ethyl groups; and halogenated alkyl groups such as 3-chloropropyl groups and 3,3,3-trifluoropropyl groups. Suitable $R^1$ groups include the same unsubstituted or halogen substituted monovalent hydrocarbon groups mentioned above but excluding those groups with aliphatic unsaturated double bonds such as the alkenyl groups such as vinyl groups and allyl groups. Amongst the groups listed above, both the R groups and the $R^1$ groups should preferably be methyl groups. The $R^2$ groups typically represent alkenyl groups of 2 to 6 carbon atoms such as vinyl groups, allyl groups, propenyl groups, butenyl groups and hexenyl groups n represents an integer of 2 or greater, and m represents either 0, or an integer of 1 or greater, and m+n is typically an integer of 20 to 2000, and preferably an integer of 50 to 1000. Furthermore, n/(m+n) should preferably be a number from 0.001 to 0.2, with values from 0.002 to 0.1 being particularly preferred.

The viscosity of the constituent (a) at 25° C. should preferably be at least 1000 mPa·s (milliPascal·seconds), with values within a range from 1000 to 1,000,000 mPa·s being particularly preferred.

Specific examples of the constituent (a) include dimethylsiloxane/methylvinylsiloxane copolymers with both terminals blocked with trimethylsiloxy groups, dimethylsiloxane/methylvinylsiloxane copolymers with both terminals blocked with dimethylvinylsiloxy groups, methylvinylsiloxane/diphenylsiloxane copolymers with both terminals blocked with trimethylsiloxy groups, methylvinylsiloxane/diphenylsiloxane copolymers with both terminals blocked with dimethylvinylsiloxy groups, dimethylsiloxane/methylvinylsiloxane/diphenylsiloxane copolymers with both terminals blocked with trimethylsiloxy groups, dimethylsiloxane/methylvinylsiloxane/diphenylsiloxane copolymers with both terminals blocked with dimethylvinylsiloxy groups, and methylvinylsiloxane/methylphenylsiloxane copolymers with both terminals blocked with trimethylsiloxy groups. These copolymers may be used singularly, or in combinations of two or more different copolymers.

Constituent (b): Organohydrogenpolysiloxane

The organohydrogenpolysiloxane of the constituent (b) used in the present invention functions as a cross linking agent, with the hydrogen atoms bonded to silicon atoms (SiH groups) within the molecule undergoing a hydrosilylation addition reaction with the alkenyl groups bonded to silicon atoms within the constituent (a). There are no particular restrictions on the molecular structure of the organohydrogenpolysiloxane, and any of the commonly known organohydrogenpolysiloxane structures, including linear, cyclic and branched three dimensional network type structures can be used, although the structure must include at least two hydrogen atoms bonded directly to silicon atoms (in other words, SiH groups) within a molecule. A structure represented by the average composition formula (2) shown below may be favorably used as the organohydrogenpolysiloxane of the constituent (b).

$$R^3{}_bH_cSiO_{(4-b-c)/2} \qquad (2)$$

wherein, $R^3$ represents an unsubstituted or substituted monovalent hydrocarbon group of 1 to 12 carbon atoms, and preferably an unsubstituted or substituted monovalent hydrocarbon group of 1 to 10 carbon atoms with no aliphatic unsaturation, and b and c are positive numbers which satisfy the requirements $0.7 \leq b \leq 2.1$ and preferably $1 \leq b \leq 2$, $0.002 \leq c \leq 1$ and preferably $0.01 \leq c \leq 0.6$, and $0.8 \leq b+c \leq 3$ and preferably $1.5 \leq b+c \leq 2.6$ respectively.

In this organohydrogenpolysiloxane, the substituent groups $R^3$ represent similar groups to those described for the substituent groups R of the organopolysiloxane of the constituent (a), namely, unsubstituted or substituted monovalent hydrocarbon group of 1 to 12 carbon atoms, and preferably unsubstituted or substituted monovalent hydrocarbon group of 1 to 10 carbon atoms with no aliphatic unsaturated bonds.

Specific examples of this type of organohydrogenpolysiloxane include cyclic methylhydrogenpolysiloxane, methylhydrogenpolysiloxane with both terminals blocked with trimethylsiloxy groups, dimethylsiloxane/methylhydrogensiloxane copolymers with both terminals blocked with trimethylsiloxy groups, dimethylpolysiloxane with both terminals blocked with dimethylhydrogensiloxy groups, methylhydrogenpolysiloxane with both terminals blocked with dimethylhydrogensiloxy groups, dimethylsiloxane/methylhydrogensiloxane copolymers with both terminals blocked with dimethylhydrogensiloxy groups, methylhydrogensiloxane/diphenylsiloxane/dimethylsiloxane copolymers with both terminals blocked with trimethylsiloxy groups, copolymers formed from $(CH_3)_2HSiO_{1/2}$ units and $SiO_{4/2}$ units, copolymers formed from $(CH_3)_2HSiO_{1/2}$ units, $(CH_3)_3SiO_{1/2}$ units and $SiO_{4/2}$ units, and copolymers formed from $(CH_3)_2HSiO_{1/2}$ units, $SiO_{4/2}$ units and $(C_6H_5)SiO_{3/2}$ units.

Furthermore, the organohydrogenpolysiloxane should be liquid at room temperature, and the viscosity at 25° C. should be from 0.1 to 1000 mPa·s, and preferably from 0.1 to 500 mPa·s, with values from 0.5 to 300 mPa·s being particularly desirable. Furthermore, the number of silicon atoms in a single molecule (or the degree of polymerization) is typically from 3 to 300, and preferably from 4 to 150.

The amount of the constituent (b) added to the composition should produce a molar ratio of the amount of hydrogen atoms bonded to silicon atoms (SiH groups) within the constituent (b) relative to the silicon atom-bonded alkenyl groups incorporated within the constituent (a) of 0.4 to 5.0 (mol/mol), with molar ratios within a range from 0.8 to 2.0 being preferred. If this molar ratio is smaller than 0.4, then the cross linking density becomes too low, and there is a danger of a deterioration in the heat resistance of the cured silicone rubber. In contrast if the molar ratio exceeds 5.0, then foaming caused by dehydrogenation reactions becomes more likely, which once again increases the danger of a deterioration in the heat resistance.

Methods of producing these organohydrogenpolysiloxanes are well-known, and compounds with varying degrees of polymerization and various molecular structures can be produced easily using known production methods. For example, a particularly common production method involves the equilibration of octamethylcyclotetrasiloxane and/or tetramethylcyclotetrasiloxane, together with a compound to from the terminal groups such as hexamethyldisiloxane or a compound incorporating a 1,1'-dihydro-2,2',3, 3'-tetramethyldisiloxane unit, in the presence of a catalyst such as sulfuric acid, trifluoromethanesulfonic acid or methanesulfonic acid, at a temperature of −10 to +40° C.

Constituent (c): Platinum Based Catalyst

The platinum based catalyst of the constituent (c) of the present invention promotes the curing addition reaction (hydrosilylation) between the aforementioned constituent (a), the constituent (b) and the constituent (e). This platinum based catalyst may utilize any platinum or platinum compound known to promote such addition reactions. Specific examples include platinum black, chloroplatinic acid, alcohol modified products of chloroplatinic acid, and complexes of chloroplatinic acid with olefins, aldehydes, vinyl siloxanes or acetylene alcohol compounds. This catalyst is used in an effective quantity as a catalyst (so-called catalytic quantity), although the actual amount added may be increased or reduced depending on the curing speed required. Typically, quantities in terms of platinum of 0.1 to 1000 ppm are used relative to the amount of the constituent (a), and quantities within a range from 1 to 200 ppm are preferred.

Constituent (d): Dry Process Silica

The dry process silica of the constituent (d) is a fumed silica which functions as a reinforcing filler for imparting physical strength to the cured silicone rubber product. The BET specific surface area should preferably be at least 50 m²/g (and typically about 50 to 500 m²/g), with values from 100 to 400 m²/g being preferred.

The dry process silica of the constituent (d) of the present invention is an essential constituent in ensuring adhesion durability with the fluororesin and the metal core, and examples include hydrophilic silica and hydrophobic silica. Examples of hydrophilic silica include Aerosil 130, 200, 300 (manufactured by Nippon Aerosil Co., Ltd. and Degussa Co., Ltd.), Cabosil MS-5, MS-7 (manufactured by Cabot Corporation), Rheorosil QS-102, 103 (manufactured by Tokuyama Corporation) and Nipsil LP (manufactured by Nippon Silica Industrial Co., Ltd.). Examples of hydrophobic silica include Aerosil R-812, R-812S, R-972, and R-974 (manufactured by Degussa Co., Ltd.), Rheorosil MT-10 (manufactured by Tokuyama Corporation) and the Nipsil SS series of products (manufactured by Nippon Silica Industrial Co., Ltd.).

The amount of the constituent (d) used is within a range from 0.1 to 10 parts by weight per 100 parts by weight of the organopolysiloxane of the constituent (a), with amounts from 0.2 to 8 parts by weight being preferred. At amounts less than 0.1 parts by weight, the cured silicone rubber often displays unsatisfactory adhesion to the substrate, whereas at amounts exceeding 10 parts by weight, the compression set of the cured silicone rubber falls, making it impractical for use as a roller at high temperatures.

Constituent (e): Alkenyl Group Containing Cyclic Diorganopolysiloxane

This cyclic diorganopolysiloxane of the constituent (e) contains at least three, and preferably four or more, alkenyl groups bonded to silicon atoms within a molecule, and is typically formed from 3 to 20, and preferably from 4 to 10, diorganosiloxane units. This constituent (e) has the function of stabilizing both the initial adhesion and the adhesion durability between the cured silicone rubber layer obtained by curing a composition of the present invention and the fluororesin layer and/or the metal core. This cyclic diorganopolysiloxane should preferably have a structure represented by, for example, the general formula (3) shown below.

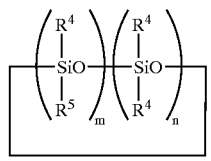

(3)

wherein, each $R^4$ represents, independently, an unsubstituted or a halogen substituted monovalent hydrocarbon group with no aliphatic unsaturated double bonds, $R^5$ represents an alkenyl group, m represents an integer from 3 to 20, and n represents an integer from 0 to 17, provided that m+n should represent an integer of 3 to 20.

In the general formula (3), examples of the unsubstituted or halogen substituted monovalent hydrocarbon groups with no aliphatic unsaturated double bonds represented by $R^4$ include the same groups as described above for the aforementioned $R^1$ group, namely, alkyl groups such as methyl groups, ethyl groups and propyl groups, aryl groups such as phenyl groups, tolyl groups and xylyl groups, and haloalkyl groups such as 3-chloropropyl groups and 3,3,3-trifluoropropyl groups, although methyl groups and phenyl groups are particularly preferred. Examples of the alkenyl group represented by $R^5$ include the same groups described above for the aforementioned $R^2$ group, namely, vinyl groups, allyl groups and butenyl groups, although vinyl groups are preferred. m represents an integer of 3 to 20, and preferably an integer from 4 to 8. Furthermore, n represents an integer of 0 to 17, and preferably an integer from 0 to 5. The value of m+n in the above formula should be an integer from 3 to 20, with integers of 4 to 10 being preferred.

Specific examples of this constituent (e) include cyclic methylvinylpolysiloxanes such as 1,3,5-trimethyl-1,3,5-trivinylcyclotrisiloxane, 1,3,5,7-tetramethyl-1,3,5,7-tetravinylcyclotetrasiloxane, and 1,3,5,7,9-pentamethyl-1,3,5,7,9-pentavinylcyclopentasiloxane, cyclic methylvinylsiloxane/dimethylsiloxane copolymers such as 1,3,5,7,7-pentamethyl-1,3,5-trivinylcyclotetrasiloxane, and cyclic methylvinylsiloxane/phenylmethylsiloxane copolymers. These cyclic diorganosiloxanes may be used singularly, or in combinations of two or more compounds.

It is presumed that the cyclic diorganopolysiloxane of the constituent (e) is involved in the addition curing reaction with the constituents (a) and (b), and during this reaction, at least two of the silicon atom-bonded alkenyl groups within the molecule participate in the addition reaction and contribute to the curing process, and that the remaining alkenyl groups contribute to the adhesion of the cured product. Additionally, because the compositions of the present invention are liquid form compositions, if the constituent (c) is not used together, then these alkenyl groups are less likely to function as adhesion active points.

The amount of the constituent (e) used should be within a range from 0.05 to 5 parts by weight, and preferably 0.1 to 4 parts by weight per 100 parts by weight of the constituent (a). At amounts less than 0.05 parts by weight, the adhesion of the composition with the fluororesin layer and/or the metal core may be unsatisfactory, whereas amounts exceeding 5 parts by weight can cause physical changes to the silicone rubber, leading to a deterioration in the adhesive property of the composition.

Other Constituents

Where necessary, other additives may also be included in a composition of the present invention, provided the inclusion of such additives does not impair the actions and effects of the composition. Examples of additives which may be incorporated include those materials described below.

Examples of reinforcing fillers for improving the hardness of the cured product and the physical strength including the tensile strength, as well as improving the adhesion durability with the fluororesin covering layer, include crystalline silica and quartz, and these materials may be used singularly, or in combinations of two or more such materials. Specific examples of the crystalline silica include Crystallite, Minusil and Imisil (tradenames). The amount of this type of reinforcing filler used should be no more than 300 parts by weight (in other words, 0 to 300 parts by weight) per 100 parts by weight of the constituent (a), and typically amounts from 5 to 300 parts by weight are preferred, with amounts from 20 to 200 parts by weight being even more desirable.

In those cases in which the curing times needs to be regulated, retarding agents may be used, and suitable examples include triallylisocyanurate, alkylmaleate, acetylene alcohols and silane- or siloxane-modified products thereof, hydroperoxides, tetramethylethylenediamine, benzotriazol, and mixtures thereof.

In addition, non-reinforcing fillers such as diatomaceous earth and calcium carbonate, coloring agents including organic dyes or inorganic pigments such as cobalt blue, and reagents for improving the heat resistance or flame resistance such as cerium oxide, zinc carbonate, manganese carbonate, titanium oxide and carbon black may also be added.

The metal core used in production of the roller may be any one of a variety of materials such as steel, aluminum and stainless steel. Furthermore, a primer treated metal core may also be used. The fluorine based latex coating (such as polytetrafluoroethylene) and the fluororesin tubes or polyimide based resin tubes described above may utilize commercially available products. For the fluororesin tubes, tetrafluoroethylene perfluoroalkylvinyl ether (PFA) tubes are preferred, and the surface which contacts the silicone rubber should preferably be treated by either corona discharge or by other treatments which improve the adhesion with silicone rubber such as sodium naphthalene methods, sputter etching methods or liquid ammonia methods. In addition, primer treatment may also be used to improve the adhesion durability.

EXAMPLES

As follows is a description of specifics of the present invention using examples. However, the present invention is in no way limited to the examples presented.

Example 1

100 parts by weight of a straight chain dimethylsiloxane polymer (with a degree of polymerization of approximately 700) with both molecular chain terminals blocked with trimethylsiloxy groups and with an average of approximately 5 pendent vinyl groups incorporated within a molecule as methylvinylsiloxane units, 2 parts by weight of Aerosil R-972 (manufactured by Degussa Co., Ltd.) as a dry process silica (fumed silica), and 0.1 parts by weight of a cyclic methylvinylpolysiloxane represented by the formula (i) shown below were mixed together uniformly. Subsequently, 3.0 parts by weight of a dimethylsiloxane/methylhydrogensiloxane copolymer with both molecular chain terminals blocked with trimethylsiloxy groups, as represented by the formula (ii) shown below, 0.1 parts by weight of 1-ethynyl-1-cyclohexanol as a reaction retarding agent, and a platinum vinylsiloxane complex in an amount of 50 ppm in terms of platinum atoms were added to the mixture and mixed well to produce a uniform silicone rubber composition 1.

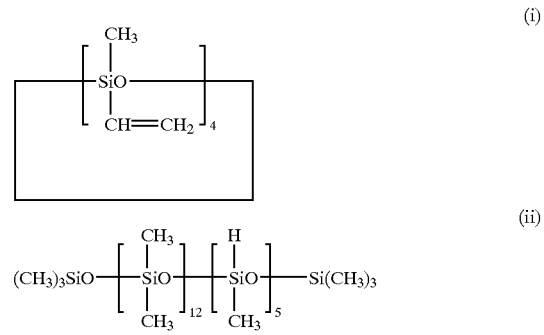

Evaluations of the adhesion strength under shear of this silicone rubber composition 1 relative to aluminum and a PFA resin film at 120° C. were conducted in accordance with the method described below.

[Method of Evaluating Adhesion Strength under Shear]

Two aluminum metal sheets 1 and 2 of width 25 mm, length 100 mm, and thickness 0.3 mm were each coated with a primer-X-33-173A/B (manufactured by Shin-Etsu Chemical Co., Ltd.) and were subsequently dried for 90 minutes at room temperature. These two primer coated metal sheets were then fixed to a tension shear adhesion test specimen preparation jig, and a suitable volume of the aforementioned silicone rubber composition 1 was injected into the jig, and cured by heating for 60 minutes in a 120° C. thermostat. As shown in FIG. 1, a test sample is thus prepared in which a silicone rubber layer 3 is sandwiched between, and bonded to the two aluminum metal sheets 1 and 2. The two edges 4, 5 of this test sample were then pulled in opposite directions at a speed of 50 mm/minute. Failure occurs within the rubber layer and/or between the rubber layer and an aluminum metal sheet. The proportion of the area where failure occurred within the rubber layer was measured. The same measurement was conducted for five test samples in total, and the mean value was taken as "cohesive failure rate". Thus, the cohesive failure rate of the rubber layer 3 was obtained. The same measurements were also performed using PFA resin films of width 25 mm, length 100 mm, and thickness 100 μm. In the case of both the aluminum sheets and the PFA resin films, the cohesive failure rate was 100%.

Comparative Example 1

A silicone rubber composition C-1 was prepared in the same manner as the example 1, with the exception that the cyclic methylvinylpolysiloxane was not included, and the adhesion strength under shear was then evaluated in the same manner as the example 1, using both aluminum and PFA resin film. In the case of both the aluminum and the PFA resin film, the cohesive failure rate was 50%.

Comparative Example 2

A silicone rubber composition C-2 was prepared in the same manner as the example 1, with the exception that the Aerosil R-972 (manufactured by Degussa Co., Ltd.) dry process silica was not included, and the adhesion strength under shear was then evaluated in the same manner as the example 1, using both aluminum and PFA resin film. In the case of both the aluminum and the PFA resin film, the cohesive failure rate was 50%.

Comparative Example 3

A silicone rubber composition C-3 was prepared in the same manner as the example 1, with the exception that the amount of the cyclic methylvinylpolysiloxane was increased to 7 parts by weight, and the adhesion strength under shear was then evaluated in the same manner as the example 1, using both aluminum and PFA resin film. In the case of both the aluminum and the PFA resin film, the cohesive failure rate was 60%.

Comparative Example 4

A silicone rubber composition C-4 was prepared in the same manner as the example 1, with the exception that 30 parts by weight of a finely crushed quartz powder with an average particle diameter of 5 μm was used instead of the dry process silica, and the adhesion strength under shear was then evaluated in the same manner as the example 1, using both aluminum and PFA resin film. In the case of both the aluminum and the PFA resin film, the cohesive failure rate was 50%.

Example 2

100 parts by weight of a straight chain dimethylsiloxane polymer (with a degree of polymerization of approximately 700) with both molecular chain terminals blocked with trimethylsiloxy groups and with an average of approximately 5 pendent vinyl groups incorporated within a molecule as methylvinylsiloxane units, 8 parts by weight of Aerosil R-972 (manufactured by Degussa Co., Ltd.) as a dry process silica, 30 parts by weight of a finely crushed quartz powder with an average particle diameter of 5 μm, and 4 parts by weight of the cyclic methylvinylpolysiloxane represented by the formula (i) shown above were mixed together uniformly. Subsequently, 3.0 parts by weight of the dimethylsiloxane/methylhydrogensiloxane copolymer with both molecular chain terminals blocked with trimethylsiloxy groups, as represented by the above formula (ii), 0.1 parts by weight of 1-ethynyl-1-cyclohexanol as a reaction retarding agent, and a platinum vinylsiloxane complex in an quantity of 50 ppm in terms of platinum atoms were added to the mixture and mixed well to produce a uniform silicone rubber composition 2.

The adhesion strength under shear of this silicone rubber composition 2 was evaluated at 120° C. relative to aluminum and PFA resin film, in the same manner as the example 1. In the case of both the aluminum sheets and the PFA resin films, the cohesive failure rate was 100%.

Example 3

A primer No. 101A/B (manufactured by Shin-Etsu Chemical Co., Ltd.) designed for addition reaction type liquid form silicone rubber was applied to an aluminum shaft of diameter 10 mm and length 300 mm. A PFA resin tube of thickness 50 μm with a primed internal surface and the aforementioned shaft were positioned in a mold about the same central axis, and the liquid form composition 1 prepared in the example 1 was then used to fill the space between the tube and the shaft. The composition was then cured by heating at 150° C. for 30 minutes, and was subsequently post cured for 4 hours at 200° C. The thus formed product was a PFA resin covered silicone rubber roller of external diameter 14 mm and length 250 mm.

In addition, this roller was incorporated into a PPC copier as the fixing roller and 100,000 paper copies were produced. Not only were excellent copies produced, but the adhesion between the silicone rubber and the PFA tube, and between the silicone rubber and the aluminum metal core were also excellent.

Comparative Example 5

A PFA resin coated silicone rubber roller of external diameter 14 mm and length 250 mm was produced in the same manner as the example 3, with the exception that the liquid form composition C-1 obtained in the comparative example 1 was used instead of the composition 1.

This roller was then incorporated into a PPC copier as the fixing roller and paper 25 copies were produced, but after 30,000 copies had been produced, the silicone rubber layer began to peel off the PFA tube.

Comparative Example 6

A PFA resin coated silicone rubber roller of external diameter 14 mm and length 250 mm was produced in the same manner as the example 3, with the exception that the liquid form composition C-2 obtained in the comparative example 2 was used instead of the composition 1.

This roller was then incorporated into a PPC copier as the fixing roller and paper copies were produced, but after 50,000 copies had been produced, the silicone rubber layer began to peel off the PFA tube.

Comparative Example 7

A PFA resin coated silicone rubber roller of external diameter 14 mm and length 250 mm was produced in the same manner as the example 3, with the exception that the liquid form composition C-4 obtained in the comparative example 4 was used instead of the composition 1.

Moreover, this roller was then incorporated into a PPC copier as the fixing roller and paper copies were produced, but after 50,000 copies had been produced, the silicone rubber layer and the aluminum metal core began to separate.

Example 4

Using the same method as the example 3, the liquid form composition 2 obtained in the example was used to form a silicone rubber layer on an aluminum shaft of diameter 10 mm and length 300 mm, by curing the composition under heat at 150° C. for 30 minutes, followed by post curing for 4 hours at 200° C. A DAI-EL latex and silicone rubber primer GLP-103SR (manufactured by Daikin Industries ltd.) was then applied uniformly to the surface of the cured product, the roller was heated at 80° C. for 10 minutes, and then a layer of DAI-EL latex GLS-213 was spray coated onto the surface, before the roller was sintered under heat at 300° C. for 1 hour. The thus formed product was a DAI-EL latex coated silicone rubber roller of external diameter 14 mm and length 250 mm.

In addition, this roller was then incorporated into a PPC copier as the fixing roller and 100,000 paper copies were produced. Not only were excellent copies produced, but the adhesion between the silicone rubber and the DAI-EL latex coating, and between the silicone rubber and the aluminum metal core were also excellent.

Comparative Example 8

A silicone rubber composition C-8 was prepared in the same manner as the example 1, with the exception that 12 parts by weight of Aerosil R-972 (manufactured by Degussa Co., Ltd.) was included as the dry process silica.

Subsequently, a DAI-EL latex coated silicone rubber roller of external diameter 14 mm and length 250 mm was produced in the same manner as the example 4, with the exception that the composition C-8 was used instead of the liquid form composition 2.

This roller was then incorporated into a PPC copier as the fixing roller and paper copies were produced, but after 10,000 copies had been produced, copies with unevenness of fixing started to appear, indents began to appear in some locations on the roller, and a partial separation developed between the silicone rubber layer and the DAI-EL latex coating.

Comparative Example 9

100 parts by weight of a straight chain dimethylsiloxane polymer (with a degree of polymerization of approximately 500) with both molecular chain terminals blocked with dimethylvinylsiloxy groups, 2 parts by weight of Aerosil R-972 (manufactured by Degussa Co., Ltd.) as a dry process silica, and 0.1 parts by weight of the cyclic methylvinylpolysiloxane represented by the formula (i) shown above were mixed together uniformly. Subsequently, 3.0 parts by weight of a dimethylsiloxane/methylhydrogensiloxane copolymer with both molecular chain terminals blocked with trimethylsiloxy groups, as represented by the above formula (ii), 0.1 parts by weight of 1-ethynyl-1-cyclohexanol as a reaction retarding agent, and a platinum vinylsiloxane complex in a quantity of 50 ppm in term of platinum atoms were added to the mixture and mixed well to produce a uniform silicone rubber composition C-9.

The adhesion strength under shear of this silicone rubber composition C-9 was evaluated at 120° C. relative to aluminum and PFA resin film, in the same manner as the example 1. In the case of both the aluminum sheets and the PFA resin films, the cohesive failure rate was 60%.

In addition, the primer No. 101A/B (manufactured by Shin-Etsu Chemical Co., Ltd.) designed for addition reaction type liquid form silicone rubber compositions was applied to an aluminum shaft of diameter 10 mm and length 300 mm. A PFA resin tube of thickness 50 μm with a primed internal surface and the shaft were then positioned in a mold about the same central axis, and the aforementioned silicone rubber composition C-9 was used to fill the space between the tube and the shaft. The composition was then cured by heating at 150° C. for 30 minutes, and was subsequently post cured for 4 hours at 200° C. The thus formed product was a PFA resin covered silicone rubber roller of external diameter 14 mm and length 250 mm.

This roller was then incorporated into a PPC copier as the fixing roller and paper copies were produced, but after 30,000 copies had been produced, the silicone rubber layer began to peel off the PFA tube.

According to a liquid form addition curable silicone rubber composition for use in a fluororesin covered roller according to the present invention, a fixing roller formed from a metal core, a silicone rubber layer, and either a fluorine based coating or a fluororesin tube can be provided which displays good adhesion between the silicone rubber layer and the metal core, and between the silicone rubber layer and the fluororesin layer, and moreover the adhesion displays excellent durability and is unlikely to separate even after prolonged use.

What is claimed is:

1. A liquid form addition curable silicone rubber composition for forming a fluororesin covered fixing roller comprising:
   (a) 100 parts by weight of an organopolysiloxane with at least two alkenyl groups bonded to non-terminal silicon atoms within a molecular chain of a molecule,
   (b) an organohydrogenpolysiloxane with at least two hydrogen atoms bonded to silicon atoms within a single molecule, in a sufficient quantity to produce a molar ratio of silicon atom-bonded hydrogen atoms within said constituent (b) relative to alkenyl groups bonded to silicon atoms within said constituent (a) of 0.4 to 5.0,
   (c) an effective quantity of a platinum based catalyst,
   (d) 0.1 to 10 parts by weight of dry process silica,
   (e) 0.05 to 5 parts by weight of a cyclic diorganopolysiloxane with at least three alkenyl groups bonded to silicon atoms within a single molecule and (f) a retarding agent that regulates curing of said composition, wherein said retarding agent is different from component (e).

2. The composition according to claim 1, wherein the organopolysiloxane of the consitituent (a) is of a structure represented by the general formula (1):

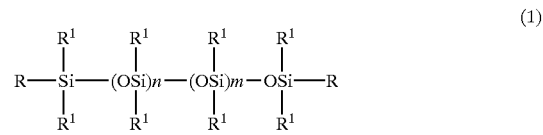

wherein R represents an unsubstituted or halogen substituted monovalent hydrocarbon group, $R^1$ represents an unsubstituted or a halogen substituted monovalent hydrocarbon group with no aliphatic unsaturated double bonds, $R^2$ represents an alkenyl group, n represents an integer of 2 or greater, and m represents 0, or an integer of 1 or greater.

3. The composition according to claim 2, wherein in the general formula (1) R each represent an alkyl group, an alkenyl group, an aryl groups, an aralkyl group, or halogenated alkyl group, each of which having 1 to 12 carbon atoms; $R^1$ each represent an alkyl group, an aryl groups, an aralkyl group, or halogenated alkyl group, each of which having 1 to 12 carbon atoms; and $R^2$ each represent an alkenyl group of 2 to 6 carbon atoms.

4. The composition according to claim 2, wherein in the general formula (1) R each represent a methyl group, $R^1$ each represent a methyl group, and $R^2$ each represent a vinyl, allyl, propenyl, butenyl or hexenyl group.

5. The composition according to claim 2, wherein in the general formula (1) m and n are integers such that m+n is an integer of 20 to 2000.

6. The composition according to claim 2, wherein in the general formula (1) m and n are integers such that n/(m+n) is a number from 0.001 to 0.2.

7. The composition according to claim 1, wherein the viscosity of the constituent (a) at 25° C. is at least 1000 mPa·s.

8. The composition according to claim 1, wherein the organohydrogenpolysiloxane of the constituent (b) has a structure represented by the average composition formula (2):

wherein, $R^3$ represents an unsubstituted or substituted monovalent hydrocarbon group of 1 to 12 carbon atoms, and b and c are positive numbers which satisfy the requirements $0.7 \leq b \leq 2.1$, $0.002 \leq c \leq 1$, and $0.8 \leq b+c \leq 3$, respectively.

9. The composition according to claim 8, wherein in the formula (2) are independently an unsubstituted or substituted monovalent hydrocarbon group of 1 to 10 carbon atoms with no aliphatic unsaturated bonds.

10. The composition according to claim 1, wherein the dry process silica of the constituent (d) is a hydrophilic silica or a hydrophobic silica.

11. The composition according to claims wherein the cyclic diorganopolysiloxane of the constituent (e) contains four or more alkenyl groups bonded to silicon atoms.

12. The composition according to claim 1, wherein the cyclic diorganopolysiloxane of the constituent (e) is formed of 3 to 20 diorganosiloxane units.

13. The composition according to claim 1, wherein the cyclic diorganopolysiloxane of the constituent (e) has a structure represented by the general formula (3):

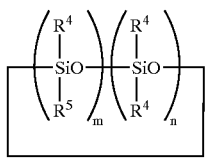 (3)

wherein, each $R^4$ represents, independently, an unsubstituted or a halogen substituted monovalent hydrocarbon group with no aliphatic unsaturated double bonds, $R^5$ represents an alkenyl group, m represents an integer from 3 to 20, and n represents an integer from 0 to 17, provided that m+n should represent an integer of 3 to 20.

14. The composition according to claim 13, wherein in the general formula (3) $R^4$ independently represents a methyl group or a phenyl group, $R^5$ independently represents a vinyl group, m is an integer of 4 to 8, and n is an integer of 0 to 5.

15. The composition according to claim 1, wherein the constituent (b) is present in an quantity such that the molar ratio of the amount of hydrogen atoms bonded to silicon atoms within the constituent (b) relative to the silicon atom-bonded alkenyl groups incorporated within the constituent (a) is within a range from 0.8 to 2.0.

16. The composition according to claim 1, wherein the constituent (c) is present in an quantity of 0.1 to 1,000 ppm in terms of platinum relative to the constituent (a).

17. The composition according to claim 1, wherein the constituent (d) is present in an quantity of 0.2 to 8 parts by weight per 100 parts by weight of the constituent (a).

18. The composition according to claim 1, wherein the constituent (e) is present in an quantity of 0.1 to 4 parts by weight per 100 parts by weight of the constituent (a).

19. The composition according to claim 1, further comprising a reinforcing filler, a retarding agent, a non-reinforcing filler, a coloring agent, a reagent for improving heat resistance or flame resistance, or a combination of two or more of these materials.

20. A fluororesin covered fixing roller comprising a metal core, a silicone rubber layer formed around an outer periphery of said core, and a fluororesin layer formed on an outer periphery of said silicone rubber layer, wherein said silicone rubber layer is a cured product of a liquid form addition curable silicone rubber composition according to claim 1.

21. A composition according to claim 1, wherein the cyclic diorganopolysiloxane is selected from the group consisting of 1,3,5-trimethyl-1,3, 5trivinylcyclotrisiloxafle, 1,3,5,7-tetraniethyl-1,3,5,7-tetraviny1Cyclotetrasiloxane, 1,3,5,7,9-pentamethyl-,1,3,5,7,9-pentavinylcyclopentasiloxane, a cyclic methylvinylsiloxane/dimethylsiloxane copolymer, and a cyclic methylvinylsiloxane/phenlylmethylsiloxane copolymer or mixtures thereof.

22. A composition according to claim 21, wherein the retarding agent is selected from the group consisting of triallylisocyanurate, alkylmaleate, an acetylene alcohol, a silane-modified acetylene alcohol, a siloxane-modified acetylene alcohol, a hydroperoxide, tetrainethylethylenediamine, and benzotriazol or mixtures thereof.

23. A composition according to claim 22, wherein the acetylene alcohol is 1-ethynyl-1-cyclohexanol.

* * * * *